United States Patent [19]

Kolze et al.

[11] Patent Number: 4,790,346
[45] Date of Patent: Dec. 13, 1988

[54] FLUID CONTROL VALVE

[76] Inventors: Lawrence A. Kolze; Barbara J. Kolze, both of 437 S. Addison St., Bensenville, Ill. 60106

[21] Appl. No.: 95,429

[22] Filed: Sep. 11, 1987

[51] Int. Cl.⁴ .................... F16K 29/02; F16K 25/00
[52] U.S. Cl. ..................... 137/331; 251/88; 251/129.19; 251/129.2
[58] Field of Search ............. 137/330, 331, 332; 251/30.03, 129.15, 129.19, 129.2, 87, 88

[56] References Cited

U.S. PATENT DOCUMENTS

| | | | |
|---|---|---|---|
| 485,984 | 11/1892 | Randall | 251/88 |
| 664,368 | 12/1900 | Grosse et al. | 251/88 |
| 1,052,939 | 2/1913 | Meyer | 137/331 |
| 1,116,341 | 11/1914 | Aborn | 137/331 |
| 1,165,197 | 12/1915 | Marsh | 251/86 |
| 1,508,103 | 9/1924 | Holt | 251/88 |
| 1,854,370 | 4/1932 | Droege | 251/86 |
| 1,942,417 | 1/1934 | Ferlin et al. | 137/332 |
| 2,735,047 | 2/1956 | Garner et al. | 251/86 |
| 2,842,333 | 7/1958 | Kent | 251/88 |
| 3,334,649 | 8/1967 | Thompson | 137/331 |
| 3,800,817 | 4/1974 | Gropp et al. | 251/87 |
| 4,114,850 | 9/1978 | Alamprese | 251/88 |
| 4,448,213 | 5/1984 | Seeley | 137/330 |
| 4,564,170 | 1/1986 | Gaines | 251/88 |

Primary Examiner—George L. Walton

[57] ABSTRACT

A fluid flow control valve with a rotatable valve member offset from its outlet seat so it engages in a different position at each closure and requires less opening force.

15 Claims, 4 Drawing Sheets

FLUID CONTROL VALVE

BACKGROUND OF THE INVENTION

On/off fluid control valves in which a valve member selectively engages a valve seat to block flow between an inlet and outlet passage have been well known for over the last century. Such valves are common in today's home appliances particularly as water shut-off valves in washing machines, refrigerator ice maker valves, and in commercial vending valves.

One appliance valve of this general type is shown in the McCarty, Jr. et al., U.S. Pat. No. 3,672,627.

Presently many water control or shut-off valves include a valve body with a reciprocating valve member therein actuated by a coil drive armature. The valve member usually has an elastomeric seat that engages and seats on a valve seat frequently formed integrally in the valve body. As the valve member moves through literally thousands of cycles, the valve seat in the valve body, which is rigid, causes permanent deformation and wear on the elastomeric seat on the valve member. Because the valve member is frequently not precision mounted within the valve body, small lateral movement of the valve member, i.e. movement laterally with respect to its axis of reciprocation, cause the elastomeric seat to frequently seat on the valve body seat slightly offset with respect to this annular permanent deformation in the elastomeric member causing an incomplete seal permitting the valve to leak when in its closed position.

Another problem in these appliance-type shut-off valves is that they require a higher opening force than necessary and hence, need a coil having more expensive copper content coils. The high opening force requirement is because inlet fluid pressure tends to shut the valve and hence the opening force F is equal to system pressure times the outlet area on the seat in the valve body. For example, if system pressure is 100 p.s.i. and valve outlet diameter 0.084 inches, then the armature force required would be 0.554 pounds.

It is the primary object of the present invention to ameliorate the problems noted above in shut-off valves.

SUMMARY OF THE PRESENT INVENTION

In accordance with the present invention, a high cycle fluid flow shut-off valve is provided in which the axis of a movable valve member is offset from the axis of the outlet seat and the valve member is caused to rotate when in its open position by inlet fluid flow so when the valve member closes it seats on the outlet seat in a different position each time thereby minimizing valve member wear and deformation and increasing valve member seat life many-fold over presently known shut-off valves.

Another important aspect of the present invention with respect to the offset relationship between the valve member and the valve seat is that the valve member is permitted to pivot slightly on its stem so as its opening force is applied to the geometric axis of the valve member, it tilts the valve member slightly and it fulcrums on the outer edge of the offset valve seat and this dramatically decreases the opening force required to be applied to the valve member and, hence, a much smaller armature and coil assembly can be utilized to energize the valve.

Toward these ends the present fluid flow control valve includes a circular valve member with an elastomeric circular valve seat both reciprocated in a plastic valve body by an armature-valve stem and coil assembly. The valve member is both rotatably and slightly pivotally mounted on the lower end of the armature-valve stem and its elastomeric valve seat selectively engages the stationery outlet seat in the valve body positioned on an axis parallel to but substantially spaced from the axis of the armature. In one embodiment of the present invention two axial projecitons positioned 120 degrees apart with respect to each other and with respect to the axis of the outlet seat, prevent the valve member from tilting when in its closed position. Alternatively one or both of these projections can be replaced with outlet valve seats so that according to the present invention there can be provided one, two, three or more outlet seats.

The geometric axis of the armature is offset from the axis of the outlet seat a substantially greater distance than the radius of the outlet seat. This relationship drastically reduced the required opening force applied to the valve member and thus reduces the size of the required energizing coil for the valve. As the valve opening force is applied to the valve member, its limited pivotal mounting on the armature permits the valve member to tilt slightly while fulcruming on the outer edge of the outlet seat.

There are two instantaneous moments acting on the valve member about this fulcrum point on the outlet seat during the initial opening movement of the valve member, one caused by the armature force tending to open the valve and the other by the fluid pressure acting on top of the valve member tending to close it. Since the valve member during this opening movement tends to fulcrum on the outlet seat, the closing force on the valve member creates a moment acting through the small radius of the outlet seat while the opening moment produced by the armature on the valve member acts through a much greater radius equal to the spacing between the axis of the armature and the fulcrum point on the outlet seat. Because of this difference in moment arm length, the opening force required is vastly reduced over present valves with in-line valve outlets.

In one embodiment of the present invention, as will appear from the detailed description below, the opening force according to the present invention is 4.57 times less than an equivalent in-line valve.

Other objects and advantages will appear from the following detailed description of the present invention.

DETAILED DESCRIPTION OF THE PREFERRED EMBODIMENTS

Figure 1:
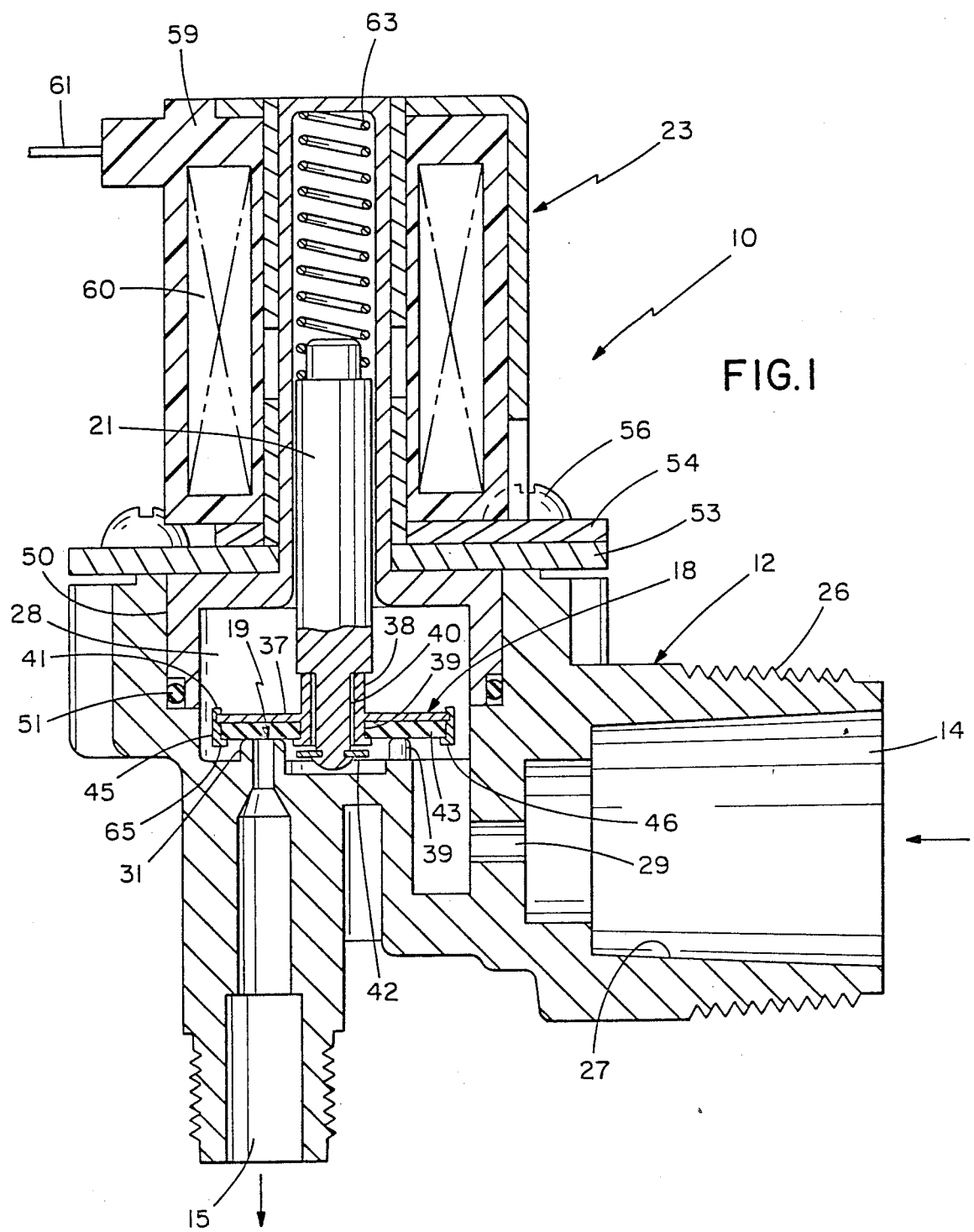
FIG. 1 is a longtidunal section of a rotating disc shut-off valve according to the present invention.

Referring to the drawings and particularly FIGS. 1 to 4, the present shut-off valve 10 is seen to generally include a unitary plastic body 12, having an inlet 14 and outlet 15, a valve member assembly 18 selectively engageable with an outlet seat 19, an armature-valve stem 21 for moving valve member assembly 18 linearly in valve body 12, and coil assembly 23 for driving the armature 21.

The valve body 12 is a one-piece injection moldable plastic molding constructed of a durable plastic such as polypropylene, and is seen to be generally cup-shaped in configuration having a threaded inlet extension 26 with a stepped inlet bore 27 that communicates with a circular valve chamber 28 through bore 29.

Figure 4:
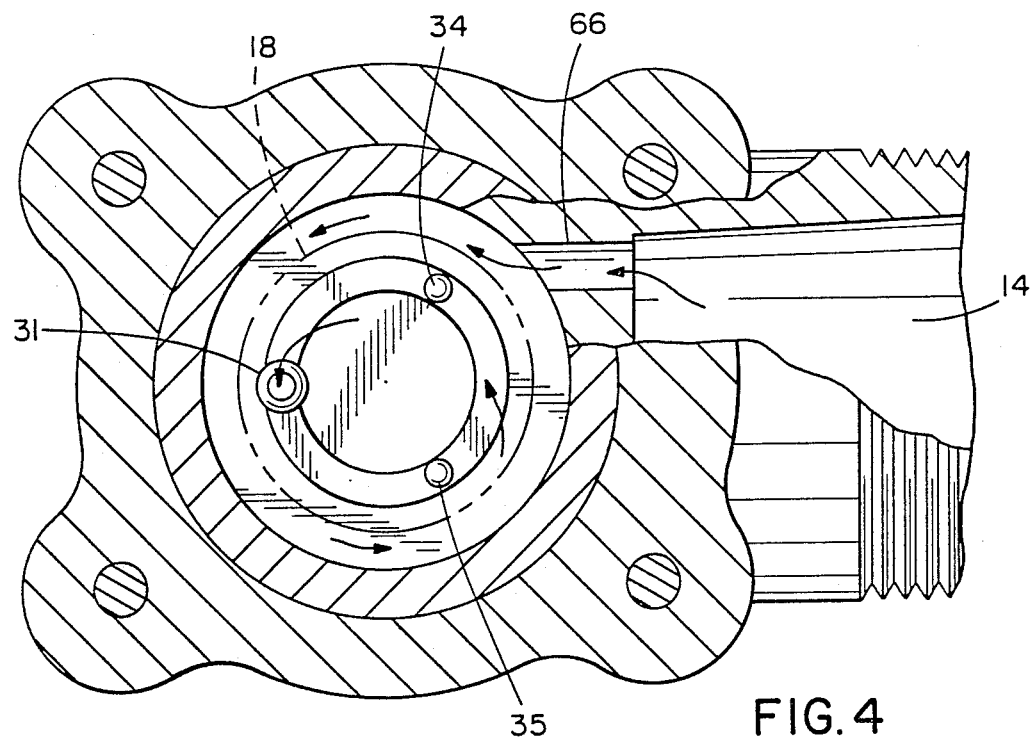
FIG. 4 is a cross-section taken generally along line 4—4 of FIG. 3 showing the position of the inlet passage and the offset relationship of the outlet seat and the valve member.

Formed integrally within chamber 28 is an annular upwardly extending projection 31 defining outlet valve seat 19 and two equally angularly spaced projections 34 and 35 (more than two may be provided) that extend upwardly the same height as the projection 31 so the valve member 18 is horizontal and balanced in the deenergized or closed position illustrated in FIG. 1. Note that these projections are illustrated in FIG. 4 in a somewhat modified embodiment to be discussed hereafter.

Figure 2:
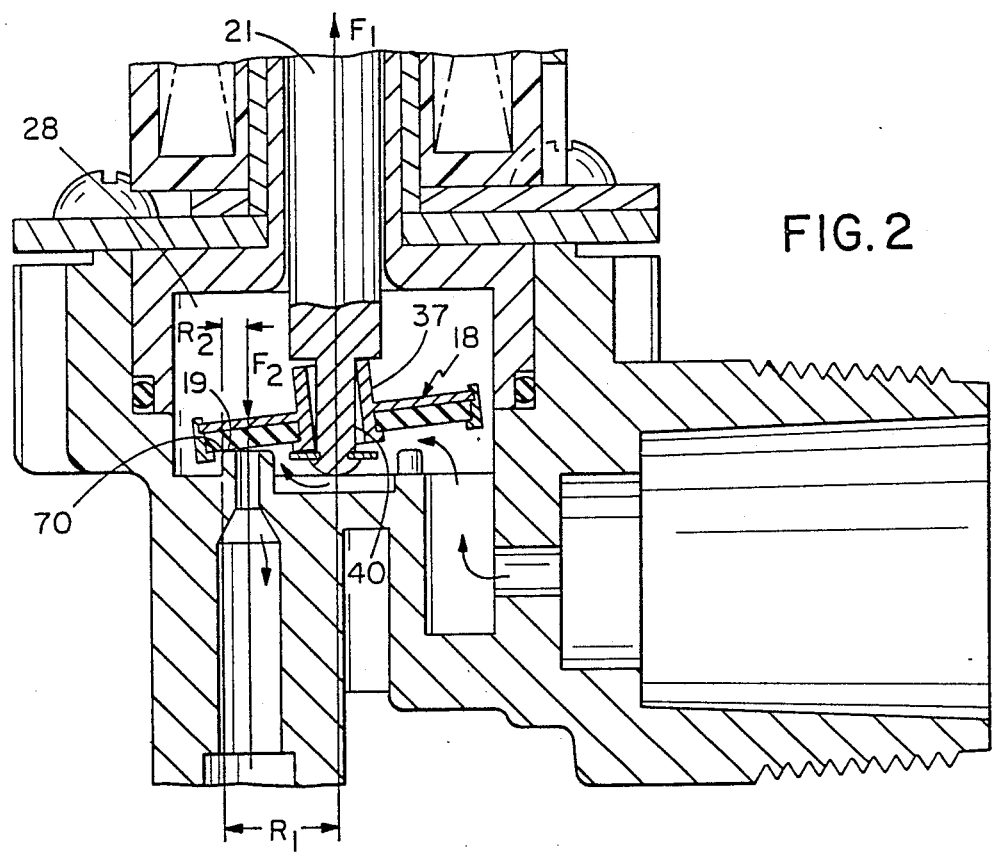
FIG. 2 is a fragmentary longitudinal section of the shut-off valve illustrated in FIG. 1 upon opening movement of the valve.

The valve member assembly 18 includes an annular circular disc member 37 having a bushing 38 loosely mounted on a reduced stem portion 40 of armature 21 and held thereon by a washer 42 staked on the end of reduced stem portion 40. The loose fit of the bushing portion 38 on the reduced stem portion 40 permits the valve member assembly 18 to freely rotate on reduced stem portion 40 and also to tilt slightly with respect to the stem portion as illustrated in FIG. 2 although the degree of tilt is somewhat exaggerated in FIG. 2.

A circular elastomeric seat 43 is held in position against circular member 37 by a holding ring 45 that has a flange 46 gripping the elastomeric seat 43 at its outer diameter and a groove 39 in the bushing 38 holds the elastomeric seat 43 at its inner diameter. Holding ring 45 is fastened to circular member 37 by a rollover at 41.

The open upper end of valve body chamber 28 is closed by cup-shaped housing member 50 having a seal 51 at its lower end that maintains fluid pressure within chamber 28. Cup-shaped housing member 50 is held in position by plate 53 which is clamped to the valve body 12 by four fasteners 56. One of the fasteners 56 may be used to hold into position coil assembly 23 through its engagement of member 54. The coil assembly 23 includes an annular encasement 59 for a wound coil 60 which has conductors 61 extending therefrom to permit supply voltage to be applied to the coil 60 to create a magnetic field for driving armature 21 upwardly against the biasing force of coil compression spring 63 which is mounted within an upward extension of cup shaped housing member 50.

Figure 3:
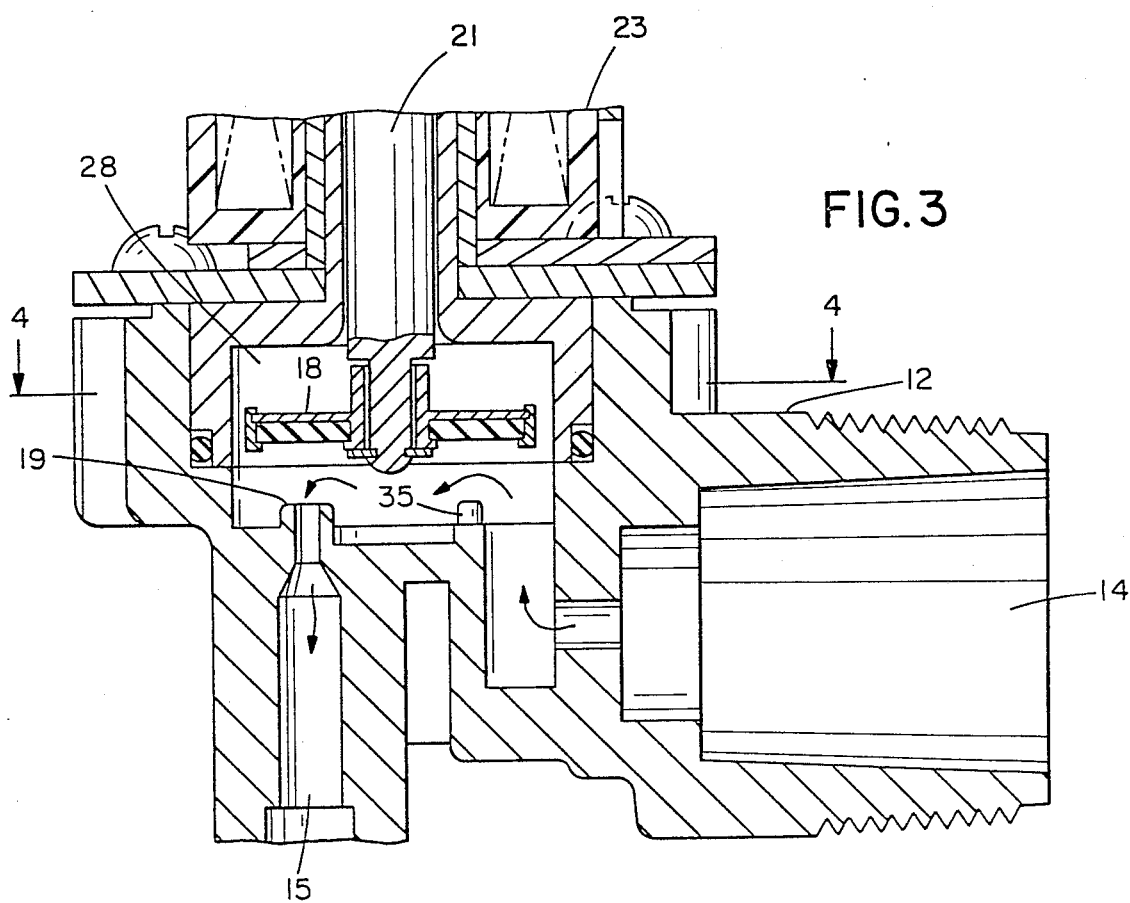
FIG. 3 is a fragmentary section of the present shut-off valve illustrated in FIG. 1 with the valve member in its open position.

Spring 63 biases the armature 21 and valve member assembly 18 to the closed position illustrated in FIG. 1 and upon energization of coil 60 the armature 21 is driven upwardly moving the valve member 18 to its open position illustrated in FIG. 3.

Inlet flow from the inlet 14 to the outlet 15 through outlet valve seat 19 causes the valve member 18 to rotate on the reduced stem 40. This can be achieved in a variety of ways. Firstly, as shown in FIG. 1, the ring 45 may have a plurality of vanes 65 on its lower surface that when impinged by inlet flow cause the valve member assembly 18 to rotate. Alternatively, and in the embodiment illustrated in FIG. 4, inlet 14 may communicate with the valve body chamber 28 through an inlet passage 66 that is tangentially disposed with respect to valve member 18.

Another way of promoting valve member rotation is to position the inlet and outlet in a non-diametral relation with respect to the rotational axis of the valve member 18.

Since the outlet seat 19 is radially offset from the geometric axis of the valve assembly 18 and armature 21, the rotation of disc 18 when in its open position illustrated in FIG. 3 almost assured that each time the valve member assembly 18 closes the valve seat will engage a different part of the elastomeric seat 43 minimizing seat wear and eliminating the permanent deformation of the valve seats heretofore common in this general type of valve.

As seen in FIG. 2, the tilting action of the valve member 18 upon upward movement of the armature 21 combined with the offset relation of the outlet seat 19 with respect to the axis of the valve member assembly 18, reduces the force necessary to open the valve. As the valve member 18 tilts or pivots with respect to armature reduced stem 40, and as the armature 21 moves upwardly, it tends to pivot or fulcrum about a point 70 on the extreme radial outside of seat 19. The opening force $F_1$ on the valve member assembly 18 produces a moment about a radius $R_1$ while the force of fluid pressure in chamber 28 tending to close the valve, designated $F_2$, acts along the center-line of the outlet seat and produces a moment acting in the opposite direction but along a much shorter radius arm $R_2$.

Because the moment arm $R_2$ is far less than the moment arm $R_1$ a much lower force $F_1$ is required to open the valve member 18 against the closing force $F_2$ produced by inlet fluid pressure than if the valve and outlet are in-line.

To illustrate this reduction in opening force, assume the effective diameter of the outlet seat to be 0.084 inches, $R_1$ to be 0.320 inches, $R_2$ to be 0.070 inches and inlet fluid pressure to be 100 p.s.i. Summing the moments about point 70, $F_1$, equals $0.070/0.320 \times (0.554) = 0.121$ pounds. This is significantly less than the 0.554 pounds ($F_2$ force) that would be required to open a similar valve if the outlet seat 19 is aligned with the axis of the valve assembly 18. In this example the armature force requirement is reduced by the lever arm ratio multiple of 4.57.

Figure 5:
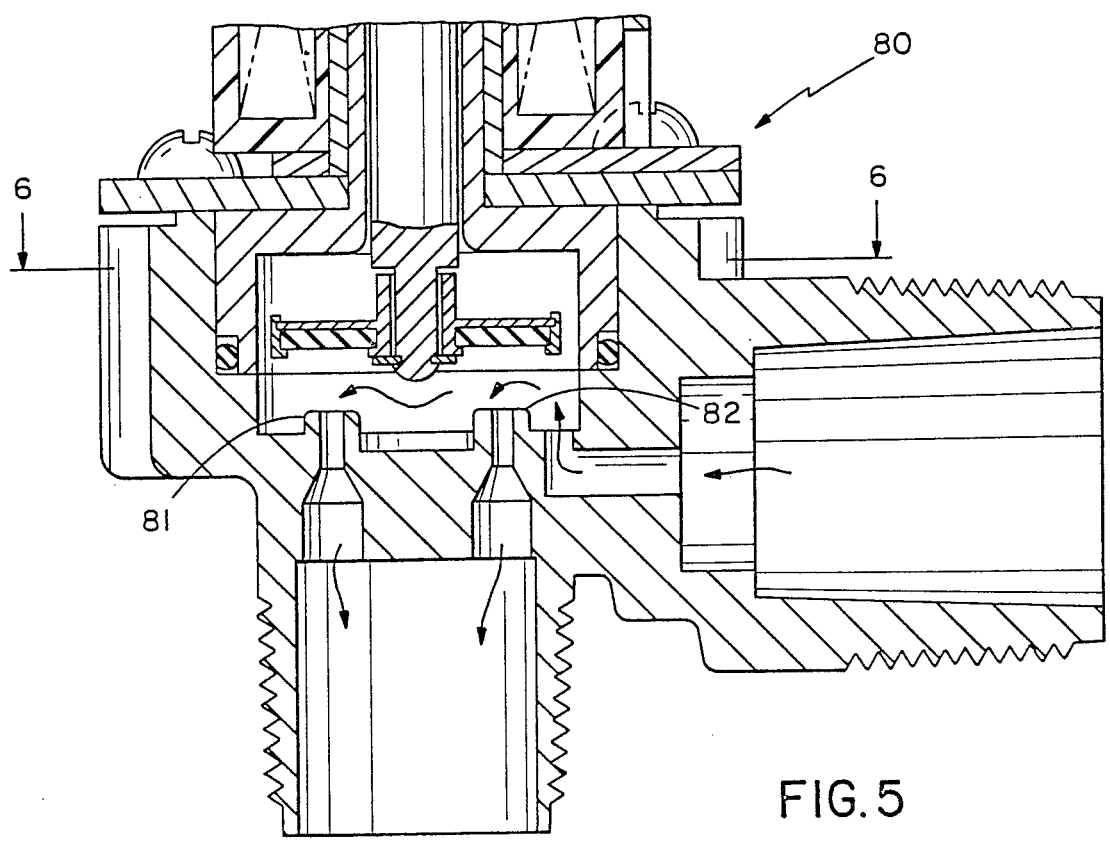
FIG. 5 is a longitudinal fragmentary section of a modified form of the present shut-off valve having three outlet seats.
Figure 6:
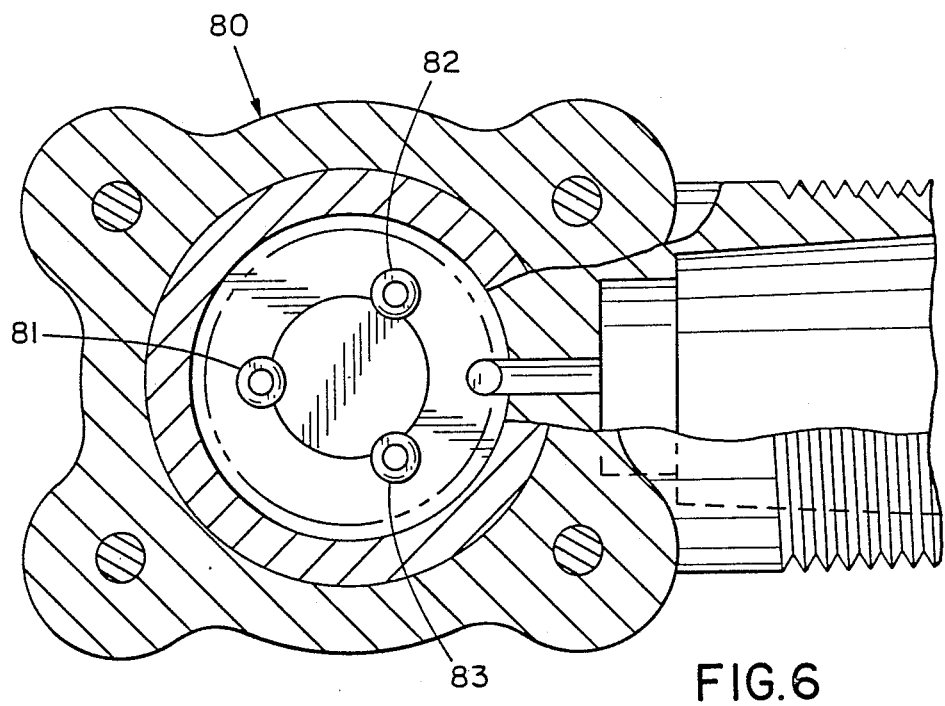
FIG. 6 is a cross-section taken generally along line 6—6 of FIG. 5 illustrating the angular relationship of the three outlet seats.

In a somewhat modified valve 80 illustrated in FIGS. 5 and 6, three equally spaced outlet seats 81, 82 and 83 are provided replacing the single outlet seat and two projections 34 and 35 provided in FIGS. 1 to 4 embodiments although the seats do not have to be equally spaced.

Figure 7:
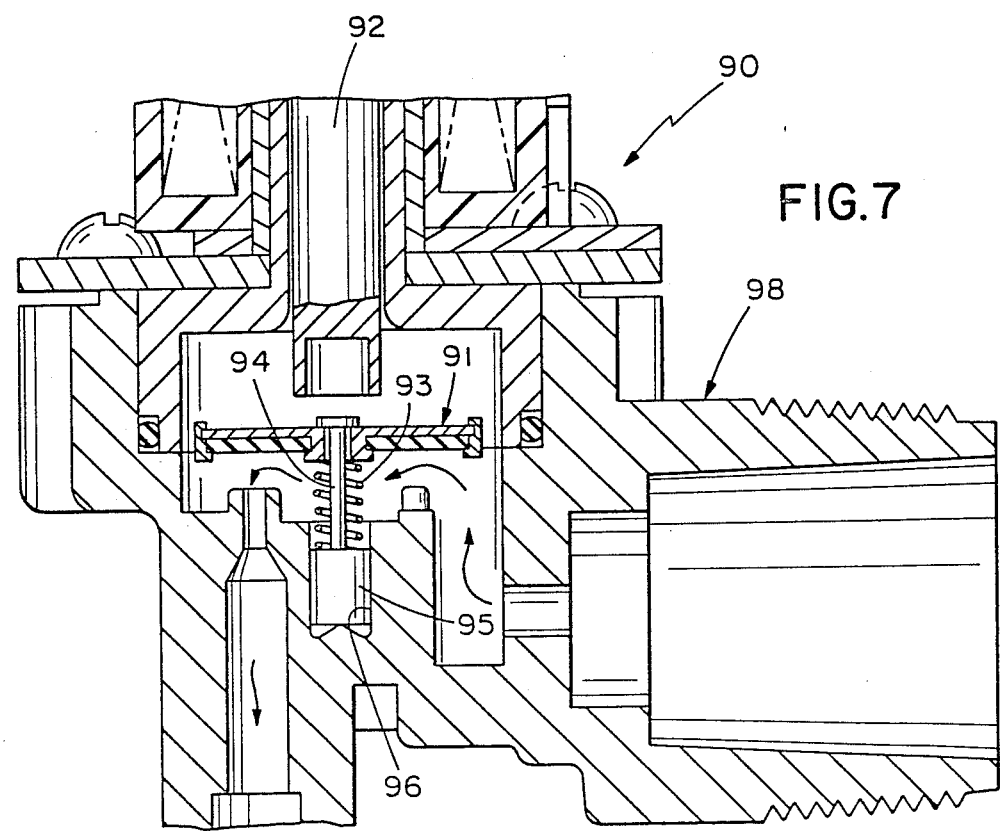
FIG. 7 is a fragmentary longitudinal section of a modified form of the shut-off valve illustrated in FIG. 1.

In an additional embodiment of the present shut-off valve 90 illustrated in FIG. 7, a valve member assembly 91 is mounted separately from armature 92 and is biased to its upward open position by a coil compression spring 93 seated on a reduced stem 94 of a rotary bushing 95 seated in a shaft seat 96 in valve body 98.

In this embodiment the bushing 95, reduced stem 94 and valve member assembly 91 rotate as a unit in shaft bore 96 and the armature 92 serves only to drive the valve member 91 to its closed position.

It should also be understood that the principles of the present invention can be applied to pilot valves rather than main shut-off valves such as illustrated in the drawings. That is, the valve member 18 can be utilized to control fluid flow through outlet seat 19 which would take the form of a pilot port as opposed to a main flow port and would act to position a main valve (not shown) in either its open or closed positions.

We claim:

1. A fluid flow control valve, comprising: a valve body, an inlet in the valve body, an outlet in the valve body and a valve seat with an axis separating the inlet and outlet, a generally flat valve member reciprocal in the valve body movable from an open position spaced from the valve seat to be closed position in engagement with the valve seat blocking fluid flow from the inlet to the outlet, and means for actuating the valve member, said valve member having an axis including a resilient seat that seats on the valve body seat, said valve member being rotatable in the valve body so a different portion of the resilient seat seats on the valve body seat as the valve members opens and closes, said valve member having means thereon upstream from the valve seat, impinged by inlet flow when the valve member is open to cause rotation of the valve member, said inlet being positioned such that inlet pressure tends to close the valve member and also positioned such that it directs inlet flow against the valve member rotation means upstream from the valve seat to cause rotation thereof, said valve body seat axis being offset from the valve member axis so the valve member tends to seat in different positions as it closes.

2. A fluid flow control valve as defined in claim 1, wherein the valve member has a geometric axis offset with respect to the axis of the valve seat.

3. A fluid flow control valve as defined in claim 1, wherein the valve member has projections thereon that are impinged by inlet flow to promote valve member rotation.

4. A fluid flow control valve as defined in claim 1, wherein the inlet is located generally tangentially in the valve body with respect to the valve member to promote valve member rotation.

5. A fluid flow control valve as defined in claim 1, wherein the inlet is axially positioned with respect to the valve member on an axis parallel to and spaced from the axis of the valve seat on the valve body, said valve member having a geometric axis, said inlet axis and said vavle seat axis being non-diametrally positioned with respect the geometric axis of the valve member to promote valve member rotation.

6. A fluid flow control valve as defined in claim 1, including a reciprocal valve stem supporting the valve member, said valve member being pivotally mounted on the valve stem, said stem being offset from the axis of the valve seat in the valve body so that as the stem moves the valve member from its closed position to its open position, the valve member tends to fulcrum on the edge of the valve seat in the valve body facilitating opening of the valve.

7. A fluid flow control valve, comprising: a valve body, an inlet in the valve body, an outlet in the valve body and a valve seat with an axis separating the inlet and the outlet, a generally flat valve member reciprocal in the valve body movable from an open position in engagement with the valve seat blocking fluid flow from the inlet to the outlet, and means for actuating the valve member, said valve member having an axis and including a resilient seat that seats on the valve body seat, said valve member having a geometric axis offset from and outside the valve seat in the valve body, said valve member being freely rotatable about the geometric axis thereof when the valve member is in its open position so that each time the valve member closes, it will seat in a different position to reduce wear on the valve member, said valve member having means thereon upstream from the valve seat, impinged by inlet flow when the valve member is open to cause rotation of the valve member, said inlet being positioned such that inlet pressure tends to close the valve member and also positioned such that it directs inlet flow against the valve member rotation means upstream from the valve seat to cause rotation thereof, said valve body seat axis being offset from the valve member axis so the valve member tends to seat in different positions as it closes.

8. A fluid flow control valve, comprising: a valve body, an inlet in the valve body, an outlet in the valve body and a valve seat separating the inlet and the outlet, a valve member reciprocal in the valve body movable from an open position spaced from the valve seat to a closed position in engagement with the valve seat blocking fluid flow from the inlet to the outlet, and means for actuating the valve member, said valve member including a resilient seat that seats on the valve body seat, said valve member having a geometric axis offset from the axis of the valve seat in the valve body, said valve member being freely rotatable about the geometric axis thereof when the valve member is in its open position so that each time the valve members closes, it will seat in a different position to reduce wear on the valve member, said valve member being offset from the axis of the valve seat in the valve body so that as the actuation means moves the valve member initially from its closed position toward its open position, the valve member tends to fulcrum on the edge of the valve seat in the valve body facilitating opening of the valve as the differential pressure acting on the valve member at the valve seat tends to close the valve member and the actuation means tends to open the valve member causing pivoting of the valve member, said inlet being positioned such that inlet pressure tends to close the valve member and also positioned such that it directs inlet flow against the valve member upstream from the valve seat to cause rotation thereof.

9. A fluid flow control valve, comprising: a valve body, an inlet in the valve body, an outlet in the valve body and a valve seat separating the inlet and the outlet, a valve member reciprocal in the valve body movable from an open position spaced from the valve seat to a closed position in engagement with the valve seat blocking fluid flow from the inlet to the outlet, and means for actuating the valve member including a reciprocal valve stem supporting the valve member in the valve body, said valve member being pivotally mounted on the valve stem, said stem being offset from the axis of the valve seat in the valve body so that as the actuation means moves the valve member initially from its closed position toward its open position, the valve member body facilitating opening of the valve as the differential pressure acting on the valve member at the valve seat tends to close the valve member and the actuation means tends to open the valve member causing pivoting of the valve member, said inlet being positioned so that inlet fluid pressure tends to close the valve member so there is a net closing force acting on the valve member, said offset relation to the valve seat from the valve stem and the pivotal mounting of the valve member being constructed to reduce the required opening force applied by the actuation means to the valve member because of a moment arm created by the offset of the valve stem from the valve seat.

10. A fluid flow control valve as defined in claim 9, wherein there is greater distance between the valve stem and the axis of the valve seat in the valve body than the distance between the axis of the valve seat and the edge of the valve seat so that a relatively small force applied to the valve stem will open the valve.

11. A fluid flow control valve as defined in claim 9, wherein the valve member is rotatable, and means to cause inlet fluid flow to rotate the valve member when in its open position.

12. A fluid flow control valve, comprising: a valve body, an inlet in the valve body, an outlet in the valve body and a valve seat separating the inlet and the outlet, a valve member reciprocal in the valve body movable from an open position spaced from the valve seat to a closed position in engagement with the valve seat blocking fluid flow from the inlet to the outlet, and means for actuating the valve member, a reciprocal valve stem supporting the valve member in the valve body, said valve member being pivotally on the valve stem, said stem being offset from the axis of the valve seat in the valve body so that as the actuation means moves the valve member initially from its closed position toward its open position, the valve member tends to fulcrum on the edge of the valve seat in the valve body facilitating opening of the valve as the differential pressure acting on the valve member at the valve seat tends to close the valve member and the actuation means tends to open the valve member causing pivoting of the valve member, there being a greater distance between the valve stem and the axis of the valve seat in the valve body than the distance between the axis of the valves seat and the edge of the valve seat so that a relatively small force applied to the valve stem will open the valve, said valve member including a resilient seat that seats on the valve body seat, said valve member being rotatable in the valve body so a different portion of the resilient seat seats on the valve body seat as the valve member opens and closes, said inlet being positioned so that inlet fluid pressure tends to close the valve member so there is a net closing force acting on the valve member, said offset relation of the valve seat from the valve stem and the pivotal mounting of the valve member being constructed to reduce the required opening force applied by the actuation means to the valve member because of a moment arm created by the offset of the valve stem from the valve seat.

13. A fluid flow control valve, comprising: a valve body, an inlet in the valve body, an outlet in the valve body and a valve stem separating the inlet and the outlet, a valve member reciprocal in the valve body movable from an open position spaced from the valve seat to a closed position in engagement with the valve seat blocking fluid flow from the inlet to the outlet, means for actuating the valve member including a reciprocal valve stem supporting the valve member in the valve body, said valve member being somewhat pivotally mounted on the valve stem, said stem being offset from the axis of the valve seat in the valve body so that as the actuation means moves the valve member initially from its closed position toward its open position, the valve member tends to fulcrum on the edge of the valve seat in the valve body facilitating opening of the valve as the differential pressure acting on the valve member at the valve seat tends to close the valve member and the actuation means tends to open the valve member causing pivoting of the valve member, and stabilizing means for engaging the valve member or the valve body in its closed position to balance the valve member and assure alignment and mating of the valve member on the valve body seat, said inlet being positioned so that inlet fluid pressure tends to close the valve member so there is a net closing force acting on the valve member, said offset relation of the valve seat from the valve stem and the pivotal mounting of the valve member being constructed to reduce the required opening force applied by the actuation means to the valve means because of a moment arm created by the offset of the valve stem from the valve seat.

14. A fluid flow control valve as defined in claim 1, wherein the means for activating the valve member includes an electromagnetic coil assembly.

15. A fluid flow control valve as defined in claim 9, wherein the means for activating the valve member includes an electromagnetic coil assembly.

* * * * *